United States Patent
Prager (10) Patent No.: US 7,258,327 B2
(45) Date of Patent: Aug. 21, 2007

(54) CARBURETOR

(75) Inventor: André Prager, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/339,558

(22) Filed: Jan. 26, 2006

(65) Prior Publication Data
US 2006/0163755 A1 Jul. 27, 2006

(30) Foreign Application Priority Data
Jan. 26, 2005 (DE) .................. 10 2005 003 559

(51) Int. Cl.
*F02M 23/03* (2006.01)

(52) U.S. Cl. .............. 261/46; 123/73 PP; 261/55; 261/63; 261/DIG. 1

(58) Field of Classification Search .............. 261/23.3, 261/43, 54, 63, DIG. 1, 46, 55; 123/73 PP
See application file for complete search history.

(56) References Cited

U.S. PATENT DOCUMENTS

| | | | |
|---|---|---|---|
| 3,439,658 A * | 4/1969 | Simonet | 123/277 |
| 4,002,704 A * | 1/1977 | Laprade et al. | 261/23.2 |
| 4,158,352 A * | 6/1979 | Blatter | 123/585 |
| 6,708,958 B1 * | 3/2004 | Warfel et al. | 261/45 |
| 6,889,637 B2 | 5/2005 | Rosskamp | 123/73 PP |
| 7,011,298 B2 * | 3/2006 | Gerhardy et al. | 261/46 |
| 7,013,851 B2 * | 3/2006 | Prager | 123/73 PP |
| 7,090,204 B2 * | 8/2006 | Zwimpfer et al. | 261/46 |
| 7,100,551 B2 * | 9/2006 | Rosskamp | 123/73 PP |
| 2003/0106508 A1 * | 6/2003 | Rosskamp | 123/73 PP |
| 2004/0051186 A1 * | 3/2004 | Gerhardy et al. | 261/43 |
| 2005/0073062 A1 * | 4/2005 | Zwimpfer et al. | 261/65 |
| 2005/0120985 A1 | 6/2005 | Rosskamp | 123/73 PP |

* cited by examiner

Primary Examiner—Richard L. Chiesa
(74) Attorney, Agent, or Firm—Walter Ottesen (57) ABSTRACT

A carburetor (18) has a carburetor housing (17) wherein an intake channel (19) is guided having a flow cross section of less than 3 cm². The carburetor (18) includes a partition wall (11) which partitions the intake channel (19) into a mixture channel (21) and an air channel (8). The partition wall (11) runs in the longitudinal direction of the intake channel (19). The carburetor (18) has a throttle flap (24, 64) pivotally journalled on a throttle shaft (25, 45, 55, 65, 75). A venturi (23) is formed upstream of the throttle shaft (25, 45, 55, 65, 75) in the mixture channel (21). A fuel opening (28) opens into the mixture channel (21) at the venturi (23). A device for dethrottling the mixture channel (21) and/or for dethrottling the air channel (8) is provided in order to compensate or equalize the nonuniform throttling of the air channel (8) and the mixture channel (21) by the throttle flap (24, 64).

17 Claims, 4 Drawing Sheets

CARBURETOR

CROSS REFERENCE TO RELATED APPLICATION

This application claims priority of German patent application no. 10 2005 003 559.0, filed Jan. 26, 2005, the entire content of which is incorporated herein by reference.

FIELD OF THE INVENTION

The invention relates to a carburetor and especially a carburetor for a two-stroke engine in a portable handheld work apparatus such as a brushcutter, motor-driven chain saw or the like.

BACKGROUND OF THE INVENTION

U.S. Pat. No. 6,889,637 and United States patent publication US 2005/0120985 A1 disclose a carburetor wherein an intake channel is guided in the carburetor housing of the carburetor. The intake channel section, which is guided in the carburetor, is partitioned in its longitudinal direction by a partition wall into a mixture channel and an air channel. A fuel opening opens into the mixture channel.

Carburetors of this kind can have an intake channel which has a small flow cross section, especially, a flow cross section of less than 3 cm$^2$. It has been shown in this type of carburetor that an uncontrolled leaning of the air/fuel mixture, which is prepared by the carburetor, results when the throttle flap pivots out of the completely open position in a direction toward the closed position.

SUMMARY OF THE INVENTION

It is an object of the invention to provide a carburetor having a small flow cross section wherein an intense leaning is avoided for a slight pivot movement of the throttle flap out of the completely open position.

The carburetor of the invention includes: a housing; an intake channel guided in the housing; the intake channel having a flow cross section and defining a longitudinal direction; a partition wall for partitioning the intake channel into an air channel and a mixture channel; the partition wall extending in the longitudinal direction; a throttle shaft pivotally journalled in the housing; a throttle flap mounted on the throttle shaft so as to pivot with the throttle shaft in the intake channel between a completely open position whereat the throttle flap only insignificantly influences the flow cross section and a closed position whereat the throttle flap substantially closes the flow cross section; a venturi formed in the mixture channel upstream of the throttle shaft; a fuel opening formed on the venturi and opening into the mixture channel; the flow cross section of the intake channel being less than 3 cm$^2$; and, means for dethrottling at least one of the mixture channel and the air channel when the throttle flap pivots out of the completely open position in a direction toward the closed position.

In carburetors having a low flow cross section, the diameter of the throttle flap compared to the diameter of the intake channel is comparatively large. Usually, the throttle flap is mounted on the side of a flattened throttle shaft or in a slot mounted so as to be centered in the throttle shaft. The side of the flattened throttle shaft faces toward the mixture channel. A section of the throttle flap therefore projects into the air channel. When pivoting the throttle flap out of the completely open position, the edge of the throttle flap, which lies upstream against the flow direction, effects an immediate throttling of the mixture channel. The edge of the throttle flap, which lies downstream and projects into the air channel, lies behind the throttle shaft as viewed in the flow direction. For small opening angles of the throttle flap, the throttle flap leads to no further significant throttling of the flow cross section in the air channel compared to the throttling in the mixture path than the throttling by the throttle shaft in the completely open position of the throttle flap. Accordingly, a throttling of the mixture channel downstream of the fuel opening results for slight opening angles; whereas, the flow cross section in the air channel remains virtually unchanged. Turbulence forms at the edge of the throttle flap lying opposite to the flow direction. This turbulence can lead to the situation that the mixture channel is additionally throttled. At most a low turbulence formation takes place at the edge lying downstream so that a lesser throttling of the air channel takes place because of this effect. In this way, the mixture becomes lean.

Means for dethrottling the mixture channel and/or for throttling the air channel are provided to prevent an uncontrolled leaning. These means thereby at least partially smooth out the uneven throttling of the air channel and mixture channel caused by the throttle flap. Preferably, an approximately uniform throttling of the mixture channel and the air channel can be achieved by the means provided.

Preferably, the flow cross section of the intake channel section, configured in the carburetor, is less than 2 cm$^2$. The partition wall advantageously extends downstream of the throttle flap up to the pivot region of the throttle shaft.

The throttle flap has a side projecting into the air channel and this side has a flattening in order to achieve a uniform throttling of the mixture channel and the air channel. Here, the throttle flap can be mounted on the side of the throttle shaft facing toward the mixture channel or the throttle flap can be mounted in a slit in the throttle shaft. The flattening of the throttle shaft leads to the situation that the downstream-lying edge of the throttle flap leads to an additional throttling of the air channel already for a slight opening angle of the throttle flap so that a uniform throttling of the mixture channel and the air channel results. It can, however, also be provided that the throttle flap is mounted on the side facing toward the air channel.

The air channel is throttled already at low rotational angles of the throttle flap. In this way, a uniform throttling of the air channel and the mixture channel is achieved which prevents an uncontrolled leaning of the mixture. An approximately uniform throttling of the air channel and the mixture channel takes place at a small rotational angle of the throttle flap of less than 20°. The air channel is preferably already throttled at a rotational angle of the throttle flap of 20°, especially at rotational angles of under 10° and advantageously already at a rotational angle of 5°.

Advantageously, an additional throttle element is provided which throttles the air channel when the throttle flap is partially open. The movement of the additional throttle element is advantageously coupled to the movement of the throttle flap. A simple configuration results when the additional throttle flap is fixed to the throttle shaft. The additional throttle element is especially a sheet metal piece. The sheet metal piece can, in a simple manner, be fixed on the throttle shaft and is simple to manufacture and has only a very low weight. The sheet metal piece can be so arranged that a throttling of the air channel takes place already at a rotational angle of the throttle shaft of a few degrees. In this way, a uniform throttling of the air channel and the mixture channel can be obtained and therefore a uniform change of the mixture composition. The additional throttle element can, however, also be made of plastic.

An uncontrolled leaning of the mixture can also be avoided with a carburetor wherein no venturi is formed in the air channel. The opening in the partition wall makes possible a pressure equalization between the air channel and the mixture channel. The air/fuel mixture can be drawn into the air channel. For a completely open position of the throttle flap, the air channel and the mixture channel should be completely separated from each other so that the scavenging advance air is substantially free of fuel and low exhaust-gas values of the two-stroke engine can be achieved. The scavenging advanced air is supplied to the two-stroke engine via the air channel. In the partially open position of the throttle flap, turbulence is formed in the region formed between the throttle flap and the partition wall. This turbulence influences the flow in the mixture channel. Because of this wind trap effect, the throttle flap effects an additional throttling of the mixture channel. The partition wall section, which is arranged upstream of the throttle shaft, has a flattening on the side facing toward the air channel and this flattening falls off in the flow direction. The flattening of the partition wall arranged upstream of the throttle flap ensures that the opening in the partition produces a connection between the air channel and the mixture channel already at low opening angles of the throttle flap and so makes possible an induction of the air/fuel mixture into the air channel. In this way, an uncontrolled leaning of the mixture is avoided.

The opening is arranged between the throttle flap and the partition wall section arranged upstream of the throttle shaft. Advantageously, the opening provides a connection between the mixture channel and the air channel already at a rotation of the throttle flap of 5°, preferably, already at less than 5° from the completely open position. The flow conditions in the mixture channel can be favorably influenced when a partition wall section (especially the partition wall section arranged upstream of the throttle flap) is provided with a thickening on the side facing toward the mixture channel. The thickening leads to an acceleration of the flow and therefore to an improved induction of fuel from the fuel opening into the mixture channel. The thickening is preferably arranged in the region of the fuel opening or upstream of the fuel opening. The throttling of the mixture channel by the opening throttle flap can be reduced in that the throttle flap has a flattening on the side, which faces toward the mixture channel, at the edge which lies opposite to the flow direction. In this way, the throttling of the mixture channel can be delayed until the opening in the partition wall establishes a connection between the air channel and the mixture channel and/or the throttle flap throttles the air channel. In this way also, a uniform throttling of the mixture channel and air channel can be achieved.

The fuel opening is arranged in direct spatial proximity to the throttle flap in the partially open position thereof. An uncontrolled leaning of the mixture in the mixture channel is to be feared especially for a configuration of this kind. The fuel opening is preferably formed at a fuel support which projects into the mixture channel. In this way, a good mixture formation and an adequate inducted fuel quantity can be ensured. It can be practical that a choke flap is mounted upstream of the throttle flap. No venturi is formed in the air channel to ensure the induction of an adequate quantity of substantially fuel-free air through the air channel.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
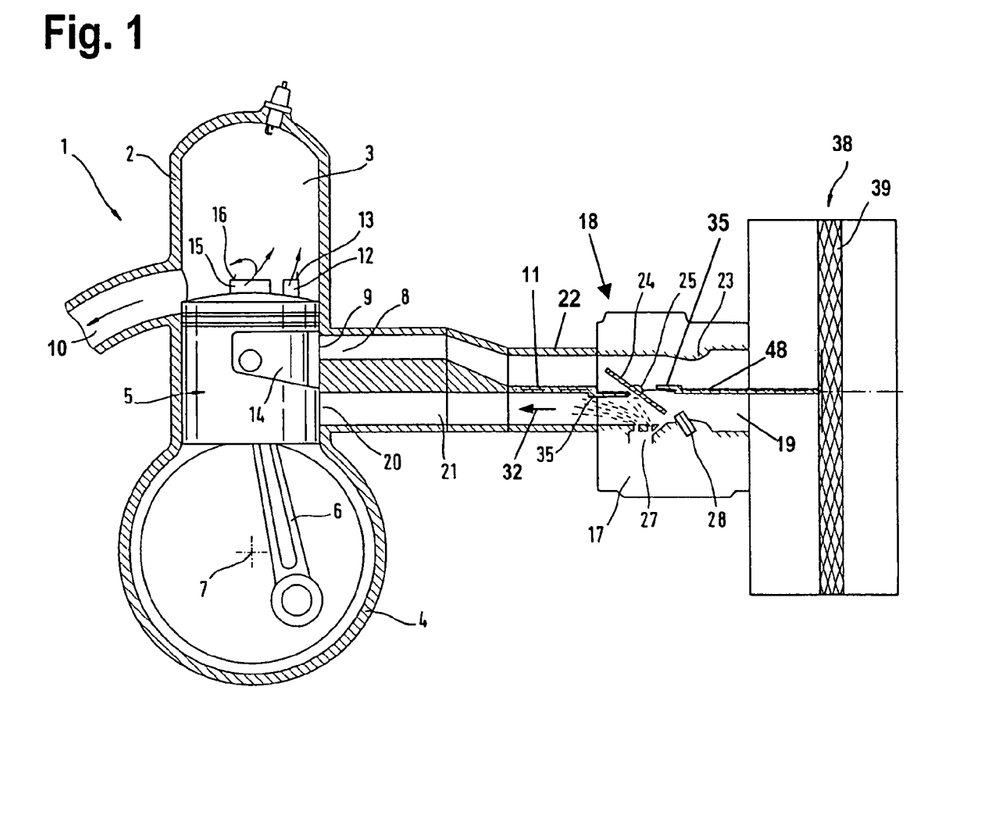
FIG. 1 is a schematic section view of a two-stroke engine having a carburetor.

The two-stroke engine 1 shown in FIG. 1 is especially a two-stroke engine having a low piston displacement, especially, a two-stroke engine in a portable handheld work apparatus such as a brushcutter, motor-driven chain saw or the like. The two-stroke engine 1 has a cylinder 2 in which a combustion chamber 3 is formed with this combustion chamber being delimited by a piston 5. The piston 5 is journalled in the cylinder 2 for reciprocating movement and drives a crankshaft 7 via a connecting rod 6. The crankshaft 7 is rotatably journalled in a crankcase 4. The crankcase 4 is connected via transfer channels 12 and 15 to the combustion chamber 3 in the region of bottom dead center of the piston 5 shown in FIG. 1. Each two transfer channels 12 and transfer channels 15 are arranged so as to be opposite each other.

In FIG. 1 only one of each of the transfer channels 12 and 15 is shown. The transfer channels 12 and 15 open via transfer windows 13 and 16 into the combustion chamber 3. In the region of top dead center of the piston 5, the transfer windows 13 and 16 are connected to an air channel 8 via two piston pockets 14 of which only one is shown in FIG. 1. The piston pockets 14 are configured symmetrically to each other in the piston 5 and the air channel 8 opens with an air inlet 9 at the cylinder 2. Substantially fuel-free air is supplied to the transfer channels 12 and 15 via the air inlet 9 and the piston pockets 14. A mixture channel 21 having a mixture inlet 20 opens at the cylinder 2. The mixture channel 21 opens into the crankcase 4 in the region of top dead center of the piston and supplies an air/fuel mixture to the two-stroke engine 1. An outlet 10 leads from the combustion chamber 3.

During operation of the two-stroke engine 1, substantially free-fuel air is supplied to the transfer channels 12 and 15 via the air channel 8 and the piston pocket 14 during the upward stroke of the piston 5 and in the region of top dead center.

The fuel-free air especially completely fills the transfer channels 12 and 15. An air/fuel mixture is inducted into the crankcase 4 via the mixture inlet 20. The air/fuel mixture is compressed in the crankcase 4 during the downward stroke of the piston 5. In the region of bottom dead center of the piston shown in FIG. 1, the substantially fuel-free air first flows out of the transfer channels into the combustion chamber 3. There, the fuel-free air scavenges or flushes the exhaust gases of a previous combustion cycle through the outlet 10 out of the combustion chamber 3. The substantially fuel-free air separates the exhaust gases from the fresh mixture which afterflows from the crankcase 4. In the upward movement of the piston 5, the mixture is compressed in the combustion chamber 3 and is ignited in the region of top dead center of the piston 5. As soon as the outlet 10 is opened by the piston 5 during the downward stroke of the piston 5, the exhaust gases flow through the outlet 10 into an exhaust-gas muffler not shown in FIG. 1.

The air channel 8 and the mixture channel 21 connect the two-stroke engine 1 via an intake channel 19 to the clean side of an air filter 38 wherein a filter material 39 is mounted. A section of the intake channel 19 is formed in the carburetor 18. The carburetor 18 has a carburetor housing 17 in which a throttle flap 24 is rotatably journalled on a throttle shaft 25. The intake channel 19 is partitioned into the air channel 8 and the mixture channel 21 by a partition wall 11 extending over the entire length of the intake channel 19. A flange 22 is mounted downstream of the carburetor 18 wherein the air channel 8 and the mixture channel 21 are guided. Downstream of the carburetor 18, the air channel 8 and the mixture channel 21 can, however, also be configured in separate components. The partition wall 11 extends over the entire length of the intake channel 19 up into the air filter 38. The partition wall 11 partitions the intake channel 19 in the longitudinal direction 48 of the intake channel 19.

A venturi 23 is configured in the mixture channel 21 upstream of the throttle flap 24 referred to the flow direction 32. The venturi 23 can also be configured in the air channel 8. A main fuel opening 28 opens into the mixture channel 21 in the region of the venturi 23. Additional ancillary fuel openings 27 open into the mixture channel 21 downstream of the venturi 23 and the main fuel opening 28. The partition wall 11 has an edge 35 at the regions arranged next to the throttle flap 24. The throttle flap 24 lies in contact engagement with the edge 35 when the throttle flap 24 is in its fully open position whereat the throttle flap only insignificantly influences the flow cross section in the intake channel 19.

Figure 2:
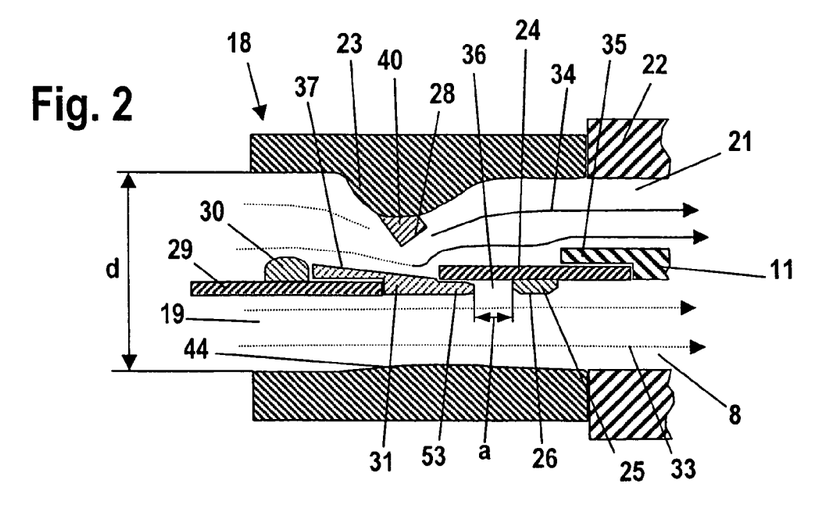
FIG. 2 is a schematic of a first embodiment of the invention showing a carburetor having a fully open throttle flap.
Figure 3:
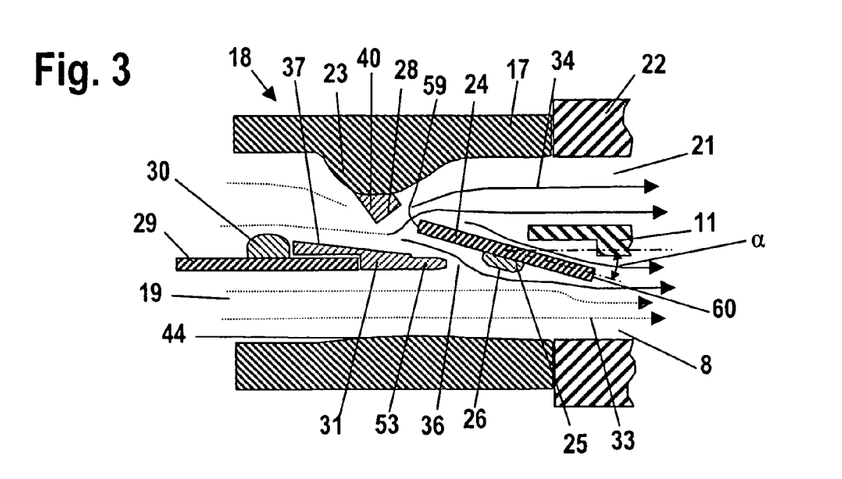
FIG. 3 shows the carburetor of FIG. 2 with the throttle flap in the partially open position.

An embodiment of the carburetor 18 is shown schematically and enlarged in FIGS. 2 and 3. The diameter (d) of the intake channel 19 shown in FIG. 2 is advantageously less than 20 mm, especially, less than 16 mm. Therefore, flow cross sections in the intake channel 19 of less than 3 cm$^2$ or less than 2 cm$^2$ result. In the carburetor 18 shown in FIG. 2, a choke flap 29 is disposed upstream of the throttle flap 24 and is pivotally journalled in the intake channel 19 on a choke shaft 30. The fuel opening 28 is formed at a fuel stub 40 which projects into the mixture channel 21. The throttle flap 24 is mounted on the side of the throttle shaft 25 facing toward the mixture channel 21. The throttle shaft 25 has a flattening 26 disposed on the side projecting into the air channel 8. The flattening 26 causes the throttle flap 24 to throttle the air channel 8 already at small opening angles of the throttle flap 24. The edge 35 on the partition wall 11 projects up to approximately the location of the throttle shaft 25.

A partition wall section 31 is arranged between the choke shaft 30 and the throttle shaft 25. The partition wall section 31 has an edge 53 against which the throttle flap 24 lies in its completely open position. The edge 53 is at a distance (a) to the throttle shaft 25 and this distance (a) can, for example, correspond approximately to the diameter of the throttle shaft 25. No venturi is configured in the air channel 8. The partition wall section 31 is configured to be planar on the side facing toward the air channel 8. The partition wall section 31 therefore runs parallel to the flow direction in the air channel 8. The partition wall section 31 has a flattening 37 on the opposite-lying side delimiting the mixture channel 21. The flattening 37 falls off in the direction toward the throttle flap 24. In this way, the flattening 37 effects an enlargement of the flow cross section in the mixture channel 21 in the region lying upstream of the throttle flap 24. The flattening 37 effects this enlargement compared to a planar partition wall 31. The flattening 37 extends approximately planarly into the edge 35. During the operation of the carburetor 18, substantially fuel-free air flows through the air channel 8 and the fuel-free air is indicated by the arrows 33 drawn with a dotted line. Fuel is metered to the substantially fuel-free air, which is inducted from the air filter 38 into the mixture channel 21, via the fuel opening 28 so that downstream of the fuel opening 28, the air/fuel mixture flows as indicated by the arrows 34 drawn by solid lines.

In FIG. 3, the throttle flap 24 is shown in a partially open position. The edge 59 of the throttle flap 24 projects into the mixture channel 21 against the flow direction, that is, the edge 59 lies upstream. The edge 59 effects a reduction of the flow cross section in the mixture channel 21 already at low opening angles of the throttle flap 24. At the same time, the edge 59 leads to the formation of turbulence in the mixture channel because of its alignment approximately perpendicular to the flow direction 32 in the mixture channel 21. A considerable disturbance of the flow in the mixture channel can result with a partition wall extending up to the throttle shaft because of the turbulence formation between the partition wall and the throttle flap. This can be avoided by the opening 36 between the throttle shaft 25 and the partition wall section 31 with the opening 36 formed by the spacing (a). The opening 36 is arranged upstream of the throttle shaft 25 and leads to the condition that the flow does not back up at the edge 59 of the throttle flap 24; instead, a mixture can be inducted also into the air channel 8. The flattening 37 thereby defines, in combination with the opening 36, a means for dethrottling the mixture channel 21. The partition wall section 31 and the throttle shaft 25 project approximately the same distance into the air channel 8. The flattening 26 of the throttle shaft 25 causes the condition that the edge 60 of the throttle flap 24 throttles the flow in the air channel 8 already at small rotation angles ($\alpha$) of approximately 10° of the throttle shaft 25. The edge 60 of the throttle flap 24 lies behind in the flow direction, that is, the edge 60 lies downstream. The flattening 26 of the throttle shaft 25 defines a means for throttling the air channel 8 at low rotational angles ($\alpha$) of the throttle flap 24. Air/fuel mixture can be inducted into the air channel 8 also via the opening formed between the edge 35 and the throttle flap 24 downstream of the throttle shaft 25. In this way, the pressure difference between the air channel 8 and the mixture channel 21 is reduced and an uncontrolled leaning at slight opening angles of the throttle flap 24 is avoided.

Figure 4:
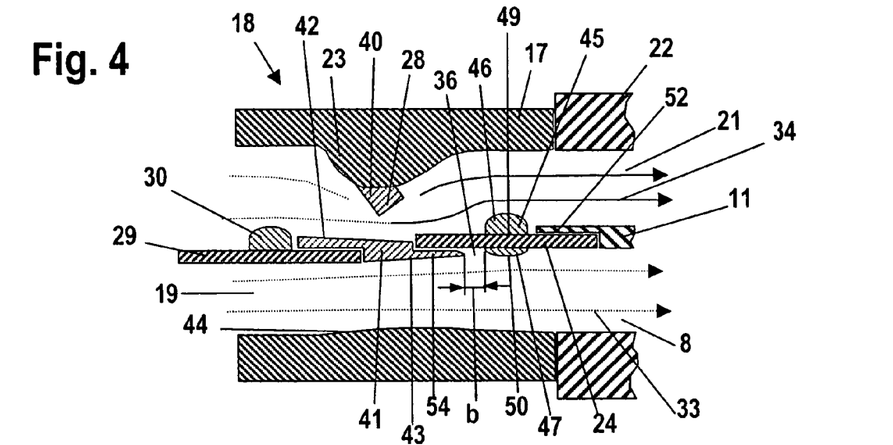
FIG. 4 is a schematic section view of another embodiment of a carburetor with the throttle flap in the fully open position.
Figure 5:
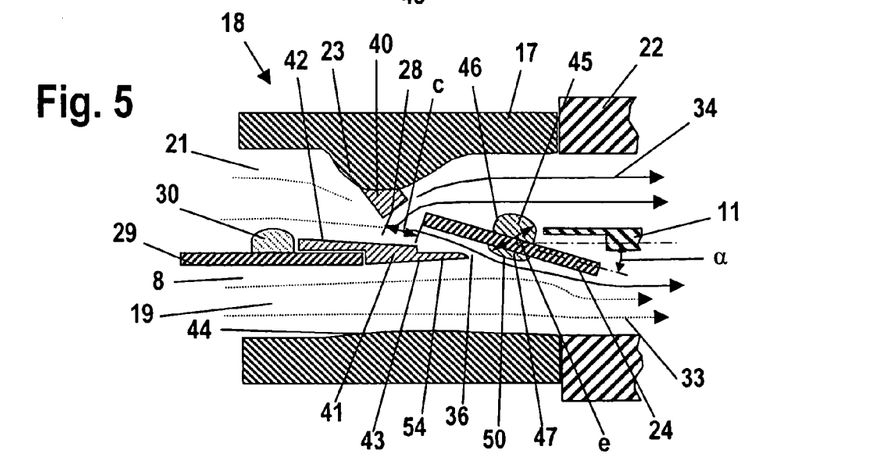
FIG. 5 is a schematic section view of the carburetor of FIG. 4 with the throttle flap partially open.

In the embodiment shown in FIGS. 4 and 5, a throttle flap 24 is pivotally held in a slit 49 in a throttle shaft 45 in the carburetor housing 17. The section 46 of the throttle shaft 45 projects into the mixture channel 21 and effects a throttling in the mixture channel 21. In contrast, a section 47 of the throttle shaft 45 projecting into the air channel 8 has a flattening 50 which leads to the condition that no noticeable throttling of the air channel 8 takes place for a completely opened throttle flap 24 but a throttling of the air channel 8 takes place already at slight rotational angles (α) of the throttle flap 24. The throttle flap 24 already throttles the air channel 8 at a rotational angle (α) of 10°. Especially, the throttle flap 24 throttles the air channel 8 already at a rotational angle (α) of approximately 5°.

A partition wall section 41 is arranged between the choke shaft 30 and the throttle shaft 45 and this partition wall section 41 ends at a distance (b) ahead of the section 47 of the throttle shaft 45. The distance (b) forms an opening 36 which is closed by the throttle flap 24 when the throttle flap 24 is in the completely open position shown in FIG. 4. In the slightly open position of the throttle flap 24 shown in FIG. 5, the opening 36 is opened so that an air/fuel mixture can be inducted into the air channel 8 from the mixture channel 21 via the opening 36. In this way, an uncontrolled leaning of the mixture in the two-stroke engine is avoided. A flattening 42 is formed on the partition wall section 41 upstream of the throttle flap 24 on the side facing toward the mixture channel 21 so that the opening 36 produces a connection between air channel 8 and the mixture channel 21 already for small rotational angles of the throttle shaft. The opposite-lying side, which faces toward the air channel 8, has a flattening 43. The flattening 42 causes a connection between the air channel 8 and the mixture channel 21 to be established already at a rotational angle (α) of approximately 5°, especially already at less than 5° from the fully open position of the throttle flap 24. In the completely open position, the throttle flap 24 lies against an edge 54 of the partition wall section 41 and closes the opening 36.

In the partially open position of the throttle flap 24 shown in FIG. 5, the throttle flap 24 is arranged in the immediate proximity of the fuel opening 28. The distance (c) between the fuel opening 28 and the throttle flap 24 is especially less than the diameter (e) of the throttle shaft 45. Because of the small spacing between the throttle flap 24 and the fuel opening 28, the influence of the position of the throttle flap 24 on the pressure at the fuel opening 28 and therefore on the composition of the air/fuel mixture is large. Especially for a fuel opening 28, which is arranged close to the throttle flap 24, measures must therefore be taken to compensate the uneven throttling of the air channel 8 and the mixture channel 21. In the air channel 8 at the elevation of the venturi 23, a narrowing 44 can be formed in lieu of a venturi and this narrowing effects only a slight narrowing of the flow cross section in the air channel 8.

Figure 6:
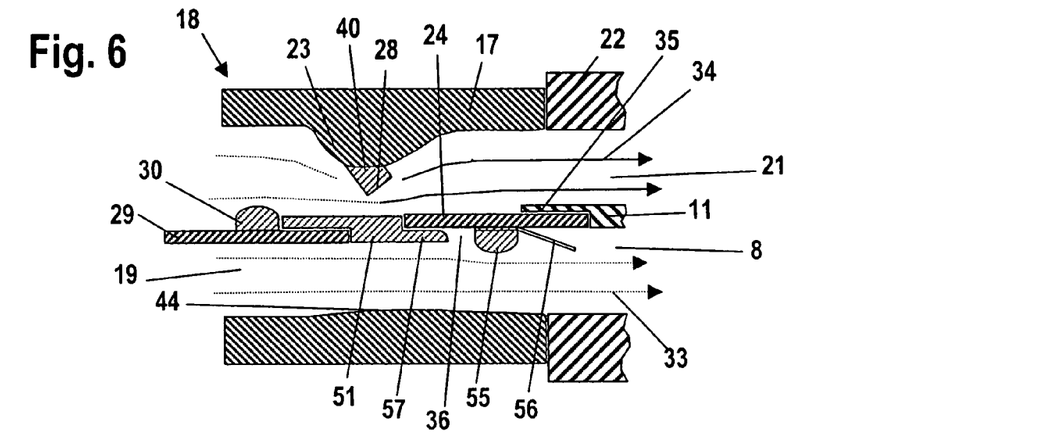
FIG. 6 is a schematic of another embodiment of the carburetor of the invention with the throttle flap fully open.
Figure 7:
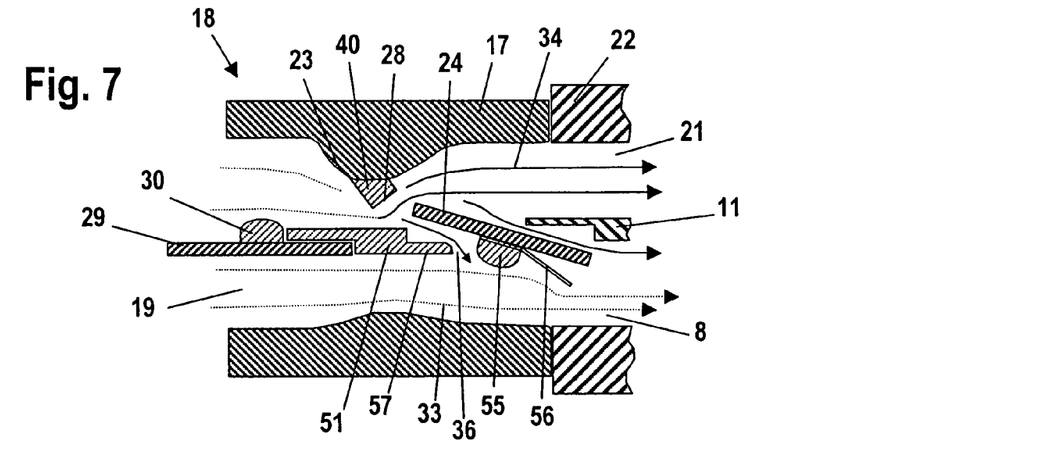
FIG. 7 is a schematic of the carburetor of FIG. 6 showing the throttle flap in a partially open position.

In the embodiment shown in FIGS. 6 and 7, the throttle flap 24 is arranged on the side of the throttle shaft 55 facing toward the mixture channel 21. A sheet metal piece 56 is held between the throttle shaft 55 and the throttle flap 24. The sheet metal piece 56 projects into the air channel 8 and extends into the air channel 8 approximately as far as the throttle shaft 55 when the throttle flap (FIG. 6) is completely open. A partition wall section 51 is arranged between the choke shaft 30 and the throttle shaft 55 and is at a distance to the throttle shaft 55. In this way, an opening 36 upstream of the throttle shaft 55 is formed which is closed in the completely open position of the throttle flap 24 shown in FIG. 6, that is, when the throttle flap 24 lies against an edge 57 formed on the partition wall section 51 as well as against an edge 35.

The sheet metal piece 56 defines an additional throttle element in the air channel 8. With the rotation of the throttle shaft 55 from the completely open position of the throttle flap 24, the piece 56 effects a narrowing of the air channel 8 already at slight rotational angles. In this way, a uniform throttling of the air channel 8 and the mixture channel 21 is achieved. Starting from a specific opening angle of the throttle flap 24, an air/fuel mixture from the mixture channel 21 can be drawn into the air channel 8 via the opening 36 so that the pressure can be equalized which arises because of the throttling in the mixture channel 21 downstream of the fuel opening 28. In this way, an adequate supply of the two-stroke engine 1 with fuel is achieved. The additional throttle element can also be configured differently and/or can be coupled to the movement of the throttle flap 24.

Figure 8:
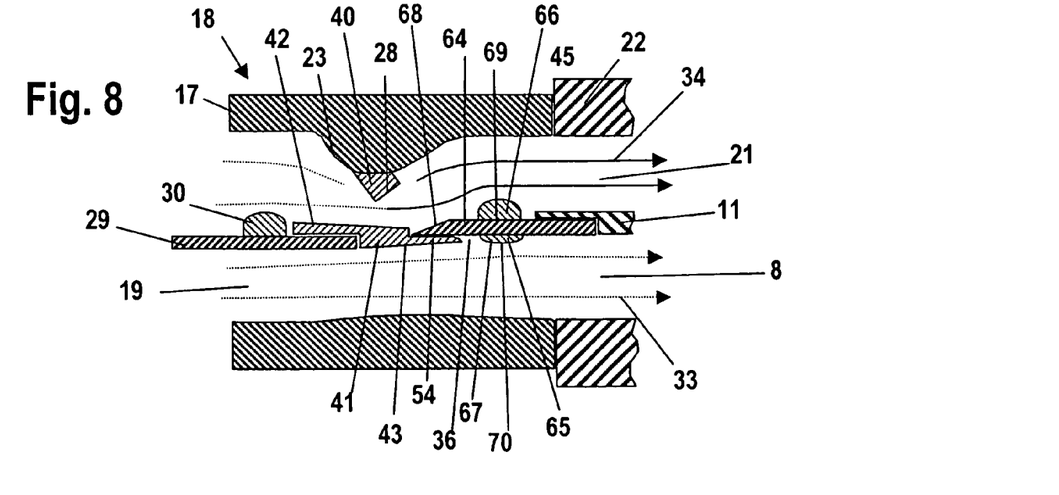
FIG. 8 is a schematic of a carburetor according to another embodiment of the invention with the throttle flap in the fully open position.
Figure 9:
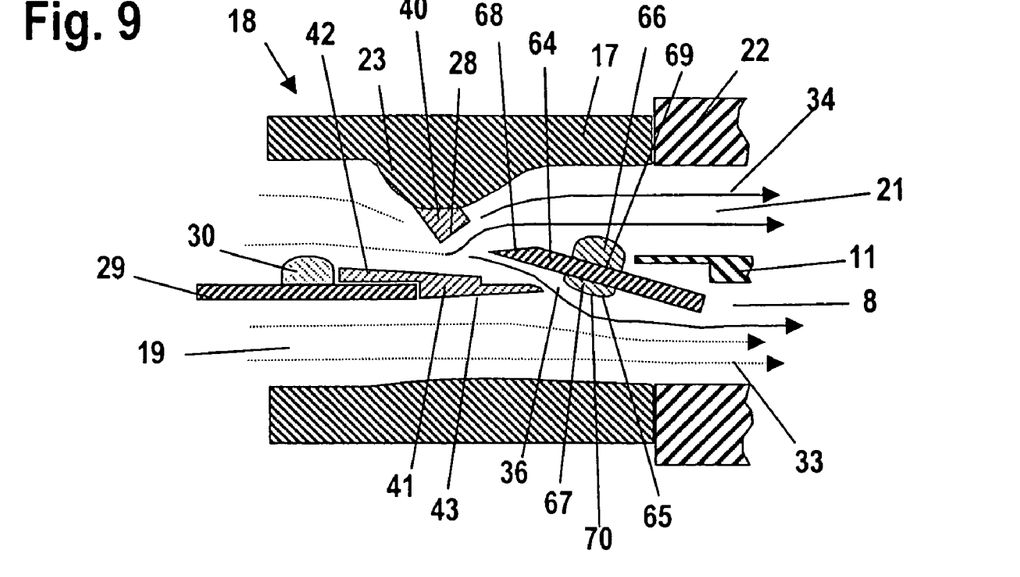
FIG. 9 shows the carburetor of FIG. 8 with the throttle flap partially open; and, FIG. 10 is a schematic of still another embodiment of the carburetor of the invention wherein the throttle flap is fully open.

In FIGS. 8 and 9, a further embodiment of the carburetor 18 is shown. A partition wall section 41 is arranged between the choke shaft 30 and a throttle shaft 65 and this partition wall section 41 corresponds to the partition wall section 41 shown in FIGS. 4 and 5. The throttle shaft 65 has a slit 69 in which a throttle flap 64 is held. The throttle shaft 65 has a section 66 which projects into the mixture channel 21. The section 67 projects into the air channel 8 and has a flattening 70 which causes the air channel 8 to be throttled already at small rotational angles (α) of the throttle shaft 65 by the throttle flap 64. An edge of the throttle flap 64 projects into the mixture channel 21 and lies opposite to the flow direction. At this edge, the throttle flap 64 has a flattening 68. The flattening 68 causes the mixture channel 21 to be less intensely throttled at small opening angles of the throttle flap 64. In this way, the throttling of the mixture channel 21 can be adapted to the throttling of the air channel 8. In order to provide a pressure equalization between the air channel and the mixture channel because of the flow backing up at the throttle flap 64, an opening 36 is formed between the edge 54 of the partition wall section 41 and the throttle shaft 65. As shown in FIG. 9, when the throttle flap 64 is partially open, mixture is also inducted into the air channel 8 along one of the arrows 34.

Figure 10:
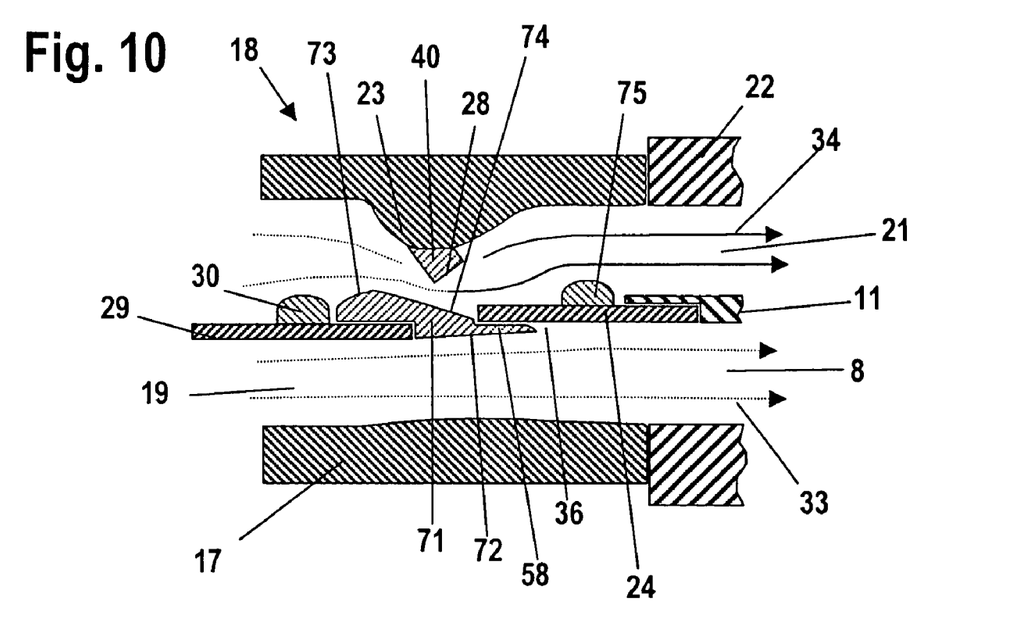

In the embodiment shown in FIG. 10, a partition wall section 71 is arranged between the choke shaft 30 and the throttle shaft 75. This partition wall section 71 has a flattening 72 on its side facing toward the air channel 8 and this flattening falls off in the flow direction. An edge 58 is formed on the partition wall section 71 whereat the throttle flap 24 lies when in the completely open position. An opening 36 is formed between the partition wall section 71 and the throttle shaft 75 and this opening is closed by the throttle flap 24 when the throttle flap 24 is in the completely open position as shown in FIG. 10. The partition wall section 71 has a flattening 74 upstream of the throttle flap 24 on the side delimiting the mixture channel 21. The flattening 74 falls off up to almost the elevation of the edge 58 so that the opening 36 is open already at small opening angles of the throttle shaft 75. The region of the partition wall section 71, which lies upstream of the fuel opening 28, has a thickening 73 which leads to a throttling of the flow cross section in the mixture channel 21 upstream of the fuel opening 28. In this way, favorable flow conditions are provided so that the influence of the turbulence, which forms on the slightly open throttle flap, is reduced and an uncontrolled leaning of the mixture at low rotational angles of the throttle shaft 75 from the fully open position of the throttle flap 24 is avoided. The throttle flap 24 is arranged on the side of the throttle shaft 75 facing toward the air channel 8. In this way, the air channel 8 is already throttled with a slight rotation of the throttle flap 24.

Other means for throttling of the air channel 8 or a dethrottling of the mixture channel 21 can be provided.

Preferably, the means are so selected that an approximately uniform throttling of the air channel 8 and mixture channel 21 results.

It is understood that the foregoing description is that of the preferred embodiments of the invention and that various changes and modifications may be made thereto without departing from the spirit and scope of the invention as defined in the appended claims.

What is claimed is:

1. A carburetor comprising:
    a housing;
    an intake channel guided in said housing;
    said intake channel having a flow cross section and defining a longitudinal direction;
    a partition wall for partitioning said intake channel into an air channel and a mixture channel;
    said partition wall extending in said longitudinal direction;
    a throttle shaft pivotally journalled in said housing;
    a throttle flap mounted on said throttle shaft so as to pivot with said throttle shaft in said intake channel between a completely open position whereat said throttle flap only insignificantly influences said flow cross section and a closed position whereat said throttle flap substantially closes said flow cross section;
    a venturi formed in said mixture channel upstream of said throttle shaft;
    a fuel opening formed on said venturi and opening into said mixture channel;
    said flow cross section of said intake channel being less than 3 cm$^2$; and,
    means for dethrottling said mixture channel and/or for throttling said air channel when said throttle flap pivots out of said completely open position in a direction toward said closed position.

2. The carburetor of claim 1, wherein said flow cross section is less than 2 cm$^2$.

3. The carburetor of claim 1, wherein said partition wall extends downstream of said throttle shaft up to the pivot region thereof.

4. The carburetor of claim 1, wherein said throttle shaft has a first side facing toward said mixture channel and a second side projecting into said air channel; and, said throttle flap is mounted on said first side and a flattening is formed on said second side.

5. The carburetor of claim 1, wherein said throttle shaft has a slit and said throttle flap is mounted in said slit; and, said throttle shaft has a side projecting into said air channel and a flattening is formed on said side.

6. The carburetor of claim 1, wherein said partition wall has a partition wall section disposed upstream of said throttle shaft; and, said partition wall section has a side facing toward said air channel and has a flattening formed on said side which tapers in flow direction.

7. The carburetor of claim 1, wherein said throttle shaft has a side facing toward said air channel and said throttle flap is mounted on said side of said throttle shaft.

8. The carburetor of claim 1, wherein said air channel is throttled when said throttle flap is pivoted out of said completely open position by an angle (α) of 20° toward said closed position; wherein said carburetor further comprises: an ancillary throttling element for throttling said air channel when said throttle flap is partially open; means for coupling said ancillary throttling element to the movement of said throttle flap; and, said ancillary throttling element is a piece of sheet metal and is fixedly mounted on said throttle shaft.

9. The carburetor of claim 1, wherein said partition wall has an opening formed therein upstream of said throttle shaft which is closed when said throttle flap is in said completely open position; said partition wall has a partition wall section lying upstream of said throttle flap; said partition wall section has a flattening which falls off toward said throttle flap; said opening is disposed between said throttle shaft and said partition wall section; and, said opening establishes a connection between said mixture channel and said air channel when said throttle flap is rotated by an angle (α) of 50° from said completely open position.

10. The carburetor of claim 1, wherein said carburetor further comprises a fuel opening in said mixture channel; said partition wall has a partition wall section disposed upstream of said throttle shaft and said partition wall section has a side facing toward said mixture channel; and, said partition wall section has a thickening formed on said side thereof in the region of or upstream of said fuel opening.

11. The carburetor of claim 1, wherein said throttle flap has a side facing toward said mixture channel and has an edge lying against the flow direction; and, said throttle flap has a flattening on said side thereof at said edge thereof.

12. The carburetor of claim 1, wherein said carburetor further comprises a fuel stub projecting into said mixture channel and a fuel opening formed on said fuel stub; and, said fuel opening is in direct spatial proximity of said throttle flap when said throttle flap assumes a partially open position.

13. The carburetor of claim 1, wherein said carburetor further comprises a choke flap mounted upstream of said throttle flap.

14. The carburetor of claim 1, wherein said air channel is devoid of a venturi.

15. A carburetor comprising:
    a housing;
    an intake channel defining a flow direction therethrough and being guided in said housing;
    said intake channel having a flow cross section and defining a longitudinal direction;
    a partition wall for partitioning said intake channel into an air channel and a mixture channel;
    said partition wall extending in said longitudinal direction;
    a throttle shaft pivotally journalled in said housing;
    a throttle flap mounted on said throttle shaft so as to pivot with said throttle shaft in said intake channel between a completely open position whereat said throttle flap only insignificantly influences said flow cross section and a closed position whereat said throttle flap substantially closes said flow cross section;
    said throttle flap having a first edge projecting into said mixture channel with said first edge facing into said flow direction and said throttle flap having a second edge lying downstream of said first edge and projecting into said air channel;
    a venturi formed in said mixture channel upstream of said throttle shaft;
    a fuel opening formed on said venturi and opening into said mixture channel;
    said flow cross section of said intake channel being less than 3 cm$^2$;
    means for dethrottling said mixture channel and/or for throttling said air channel when said throttle flap pivots out of said completely open position in a direction toward said closed position; and, said dethrottling means further operating to at least partially balance a non-uniform throttling of said air channel and said mixture channel caused by said throttle flap.

16. The carburetor of claim 15, said partition wall having a wall section lying upstream of said throttle flap; said wall section having a side facing toward said mixture channel; and, said side of said wall section defining a flattening falling off in elevation toward said throttle flap.

17. A carburetor comprising:
a housing;
an intake channel defining a flow direction therethrough and being guided in said housing;
said intake channel having a flow cross section and defining a longitudinal direction;
a partition wall for partitioning said intake channel into an air channel and a mixture channel;
said partition wall extending in said longitudinal direction;
a throttle shaft pivotally journalled in said housing;
a throttle flap mounted on said throttle shaft so as to pivot with said throttle shaft in said intake channel between a completely open position whereat said throttle flap only insignificantly influences said flow cross section and a closed position whereat said throttle flap substantially closes said flow cross section;
a venturi formed in said mixture channel upstream of said throttle shaft;
a fuel opening formed on said venturi and opening into said mixture channel;
said flow cross section of said intake channel being less than 3 $cm^2$;
means for dethrottling said mixture channel and/or for throttling said air channel when said throttle flap pivots out of said completely open position in a direction toward said closed position;
said throttle flap having a side facing toward said mixture channel and an edge facing into said flow direction; and,
said throttle flap having a flattening formed on said side at said edge.

* * * * *

UNITED STATES PATENT AND TRADEMARK OFFICE
CERTIFICATE OF CORRECTION

PATENT NO.        : 7,258,327 B2                                Page 1 of 1
APPLICATION NO.   : 11/339558
DATED             : August 21, 2007
INVENTOR(S)       : Andre Prager It is certified that error appears in the above-identified patent and that said Letters Patent is hereby corrected as shown below:

<u>In column 10</u>:
Line 10: delete "50°" and substitute -- 5° -- therefor.

Signed and Sealed this

Eighteenth Day of December, 2007

JON W. DUDAS
*Director of the United States Patent and Trademark Office*